June 3, 1958
I. HAGMAN
2,837,250
MEASURING AND DISPENSING ATTACHMENT
Filed Dec. 7, 1954
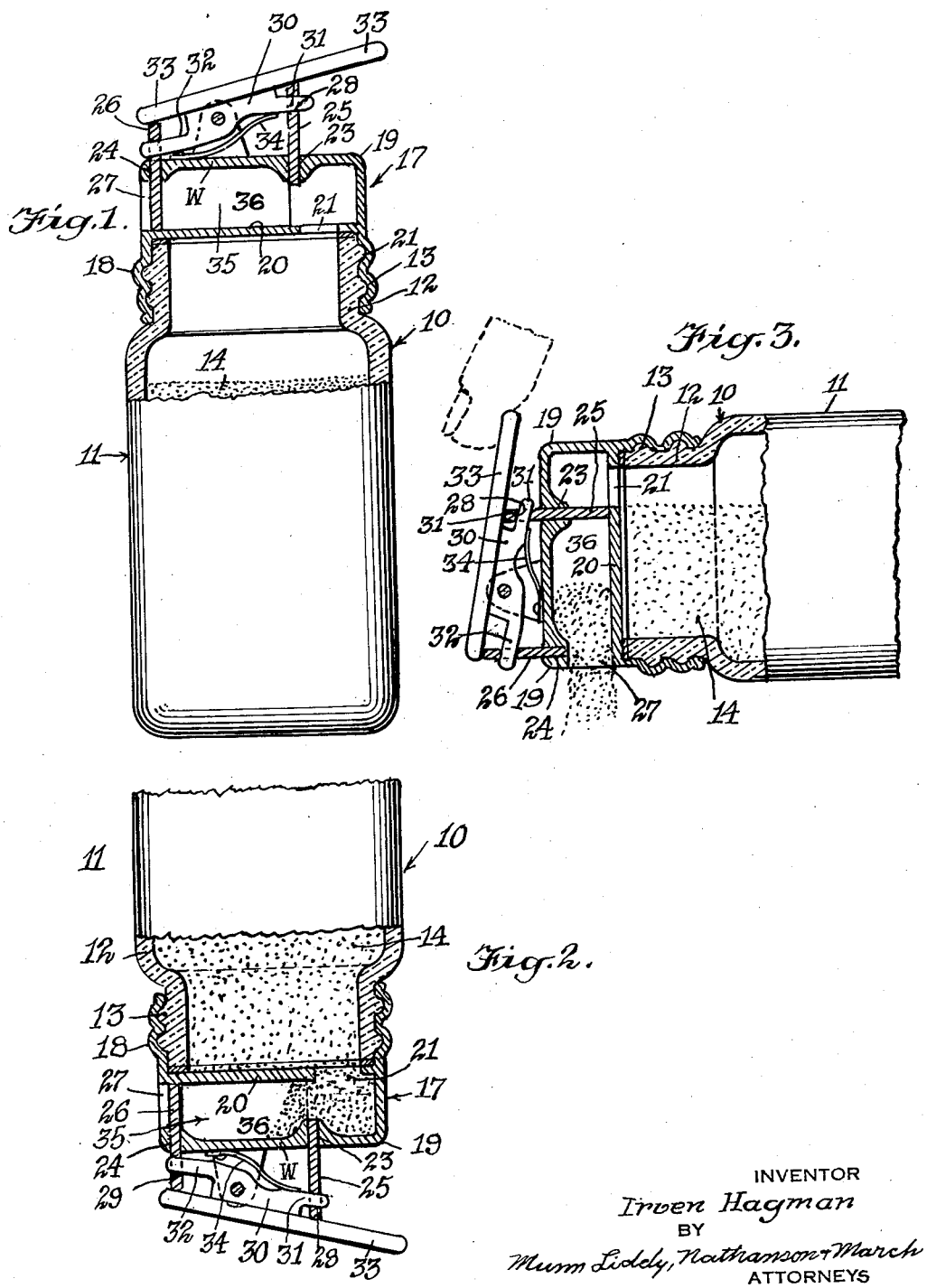
INVENTOR
Irven Hagman
BY
Munn Liddy, Nathanson & March
ATTORNEYS

United States Patent Office 2,837,250
Patented June 3, 1958

2,837,250

MEASURING AND DISPENSING ATTACHMENT

Irven Hagman, New York, N. Y.

Application December 7, 1954, Serial No. 473,625

5 Claims. (Cl. 222—449)

This invention relates to a dispenser, and more particularly to a dispensing attachment for use with a container which contains a substance to be dispensed.

The desirability of providing a dispenser for dispensing a predetermined quantity of powdered foodstuff or the like from a container has long been recognized. This type of dispenser would, of course, eliminate the unsanitary and unsatisfactory results obtained when the foodstuff is measured out by means of a spoon or other measuring unit. Various dispensing devices have been proposed in order to fill this need. However, because of their construction, such dispensers did not retain the predetermined measure for a later use. In addition, in many instances, because of the construction of the proposed dispensers, the powdered foodstuff was coagulated by pressure exerted thereon or became more finely ground than desired, whereby the foodstuff itself did not retain desirable taste, appearance and stability characteristics.

It is an object of the present invention to provide a dispensing attachment for use with a container of foodstuffs in which a predetermined quantity of said footstuffs may be measured out for dispensing purposes.

It is a further object of the present invention to provide a dispensing attachment for use with a container of foodstuffs which retains a predetermined quantity thereof in place for later use.

Still another object of the present invention is to provide a dispensing attachment for use with a container of foodstuffs which is adapted to replace the container cap during storage of the container.

Still another and further object of the present invention is to provide a dispensing attachment for containers of foodstuffs which will in no way impair the stability, quality, or appearance of the foodstuff to be dispensed.

Yet another object of the present invention is to provide a dispensing attachment for containers of foodstuffs which is inexpensive to manufacture, easy to produce, and simple to attach to the container.

Other objects and adavntages are set forth in greater detail in the accompanying specification taken in conjunction with the accompanying drawings, in which:

Fig. 1 is a side elevation partly in section of the dispensing attachment of the present invention secured to a container;

Fig. 2 is a side elevation partially in section and partially broken of the dispensing attachment of the present invention secured to a container in inverted position; and Fig. 3 is a side view partially in section and partially broken of the disepnsing attachment of the present invention secured to a container and dispensing a predetermined quantity of the contents of the container.

Referring to the drawings, there is shown a container 10 having a body 11 and a neck portion 12 provided with exterior threads 13. The body 11 of the container 10 contains powdered foodstuffs 14, as for example, instant coffee, instant tea, or the like. When purchased, the container is provided with a cap, not shown, engaged by means of threads on the cap cooperating with the threads 13 on the neck of the container. The container may be of glass, metal, plastic, or any other suitable material. The usual manner of dispensing foodstuffs from the container; viz., by means of a spoon or other measuring device, sometimes results in an unsanitary condition or one in which the contents may be spilled and therefore wasted.

According to the present invention, I have provided a dispensing attachment 17 having a threaded sleeve portion 18 at the base thereof and a body portion 19 above the sleeve, with a top wall W. The threaded portion 18 is adapted to engage the threads 13 on the neck of the container 10 to secure the disepnsing attachment to the container. There is provided a plate 20 intermediate the sleeve portion 18 and the body 19 of the dispensing attachment. The plate 20 extends substantially over the entire top of the container and is provided with a filling opening 21 near one side of the dispensing attachment intermediate the sleeve portion 18 and the body portion 19. The plate is shown as integral with the sleeve portion 18. However, the plate may comprise a separate piece or be integral with the body portion 19. The top wall W of the body portion 19 is provided with a channel 23 near one side thereof. The other side of the body portion has another channel 24 therethrough. Closure plates 25 and 26 are slidably engaged in the channels 23 and 24 respectively for the purposes hereinafter set forth. The body portion 19 is provided with a dispensing orifice 27 adjacent the channel 24. The upper extremities of each of the plates 25 and 26 are provided with openings 28 and 29 respectively. A pivotally mounted bar 30 is provided at each of its extremities with arms 31 and 32 engaged in the openings 28 and 29 of the plates 25 and 26 respectively. A lever 33 is secured to the top of the plates 25 and 26. Resilient means in the form of a spring 34 normally urges the plate 26 into the body portion through the channel 24 closing off the orifice 27. In this position the body 19, plate 20 and plate 26 form a chamber 35 with the orifice 27 closed off. Upon pressure being exerted by means of the manual operation of the lever 33, as for example, by means of the manual operation, as shown in Fig. 3, the lever is pressed downwardly against the action of the spring 34 causing the plate 25 to be urged downward into the body 19 and through the channel 23. This action forms a sub-chamber 36 within the body portion, as shown in Fig. 3. At the same time when such pressure is exerted as shown and described, the plate 26 moves upward out of the body portion 19, whereby the orifice 27 is opened for the dispensing of the material.

In the operation of the dispensing attachment of the present invention, the dispensing attachment 17 is secured to the neck of the container in place of the usual cap. The container is then inverted so that the contents 14 thereof pass through the the orifice 21 into the chamber 35. The container is then tilted whereby the contents 14 in the chamber 35 will occupy the sub-chamber 36. The sub-chamber 36 is so constructed as to hold only a predetermined quantity such as a teaspoonful of the contents. The lever 33 is then pressed downwardly thereby sealing off one portion of the chamber 35 and the contents are dispensed through the orifice 27, as shown in Fig. 3.

It is to be noted that with the use of this invention all of the operations may be conducted until the contents of the container occupy only the sub-chamber 36 and thereafter the container may be stored for later use whereupon by pressing the lever 33 even at a much later time, only the predetermined quantity of the contents will pass from the orifice 27. The predetermined quantity of the contents does not return to the body 11 of the container 10, but may be stored as long as desired in the subchamber 36, In addition, the dispensing attachment of the present invention will not crush any of the contents so that coagulation of the same is prevented. Also the construction of the dispensing attachment of the present invention is such that no additional grinding or powdering of the contents will occur with the use thereof for only a predetermined quantity of the contents can pass into the chamber 35 and upon tilting only this predetermined quantity will pass into the sub-chamber 36 for use without effecting in any way the quality, appearance, or stability of the contents.

It will be understood that the dispensing attachment may be constructed of any suitable and desirable material.

Variations and modifications may be made without departing from the spirit of the invention or the scope of the appended claims.

I claim:

1. A dispensing attachment for use with a container having substance which is to be dispensed comprising means providing a narrow measuring chamber adapted to hold a predetermined quantity of said substance, said means having a dispensing orifice at one end of the chamber and having a filling opening at a side of the chamber, said opening communicating with the interior of the container and said chamber-providing means having a wall at the side of the chamber, containing said filling opening and being adapted to constitute virtually a complete closure for the container; a movable closure member for said dispensing orifice, carried by the said means; a movable partition member carried by said means, insertable in and removable from the chamber, said partition member when in inserted position dividing the chamber into two parts which communicate respectively with said opening and orifice; and manually operable means carried by said chamber-providing means for actuating both said members to cause the dispensing orifice to be closed when the partition member is removed from the chamber and vice versa, said chamber-providing means constituting a low cap for said container.

2. The invention as defined in claim 1 in which the said wall of the chamber-providing means is circular and constitutes a shelf for holding a quantity of dry substance, obtainable from the container, when the latter is upright.

3. The invention as defined in claim 2 in which the chamber-providing means has a top wall adapted to hold a quantity of said dry substance when the container is inverted.

4. The invention as defined in claim 1 in which the chamber-providing means has a top wall adapted to hold a quantity of dry substance, obtainable from the container, when the latter is inverted.

5. A dispensing attachment for use with a container having substance which is to be dispensed, comprising means removably attachable to the container over the mouth thereof, providing a narrow measuring chamber disposed broadside to the mouth of the container and having both bottom and top walls adapted to hold a predetermined quantity of said substance when the container is respectively either upright or inverted, said bottom wall being circular and adapted to span the container mouth, said means having a dispensing orifice at one end of said chamber and a filling opening in said bottom wall adjacent the opposite end of said chamber and communicating with the interior of the container, said top wall having a slot adjacent said dispensing orifice and a second slot disposed in a plane located between said orifice and filling opening; movable plates carried by said slots, one plate comprising a movable closure for said orifice and the other plate being insertable and adapted to constitute a partition in said chamber; and manually operable means for actuating said plates to cause the dispensing orifice to be closed when the partition plate is out of the chamber and vice versa, said chamber-providing means constituting a low cap for said container.

References Cited in the file of this patent

UNITED STATES PATENTS

| | | |
|---|---|---|
| 346,718 | Capewell | Aug. 3, 1886 |
| 1,015,680 | Hollingsworth | Jan. 23, 1912 |
| 1,724,751 | Cushing | Aug. 13, 1929 |
| 1,891,038 | Barros | Dec. 13, 1932 |
| 1,939,939 | Worrell | Dec. 19, 1933 |
| 2,130,941 | Belveal | Sept. 20, 1938 |

FOREIGN PATENTS

| | | |
|---|---|---|
| 236,046 | Great Britain | July 2, 1925 |